(12) United States Patent
Jobert et al.

(10) Patent No.: US 10,361,785 B2
(45) Date of Patent: Jul. 23, 2019

(54) METHOD FOR TRANSMITTING DATA IN A TIME-DOMAIN WAVELENGTH-INTERLEAVED OPTICAL NETWORK

(71) Applicant: ORANGE, Paris (FR)

(72) Inventors: Sébastien Jobert, San Jose, CA (US); Ahmed Triki, Lannion (FR); Paulette Gavignet, Tregastel (FR); Bernard Arzur, Lannion (FR); Esther Le Rouzic, Trebeurden (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 15/025,882

(22) PCT Filed: Sep. 19, 2014

(86) PCT No.: PCT/FR2014/052337
§ 371 (c)(1),
(2) Date: Mar. 29, 2016

(87) PCT Pub. No.: WO2015/044567
PCT Pub. Date: Apr. 2, 2015

(65) Prior Publication Data
US 2016/0226590 A1   Aug. 4, 2016

(30) Foreign Application Priority Data
Sep. 30, 2013 (FR) ...................... 13 59449

(51) Int. Cl.
*H04B 10/27* (2013.01)
*H04J 14/02* (2006.01)
*H04Q 11/00* (2006.01)

(52) U.S. Cl.
CPC .......... *H04B 10/27* (2013.01); *H04J 14/0267* (2013.01); *H04J 14/0272* (2013.01);
(Continued)

(58) Field of Classification Search
None
See application file for complete search history.

(56) References Cited

U.S. PATENT DOCUMENTS

| | | | |
|---|---|---|---|
| 2005/0190770 A1* | 9/2005 | Saniee | H04L 47/56 370/395.4 |
| 2005/0232633 A1* | 10/2005 | Haxell | H04Q 11/0062 398/75 |
| 2006/0198299 A1* | 9/2006 | Brzezinski | H04L 47/10 370/229 |

FOREIGN PATENT DOCUMENTS

WO   WO 2012/022884 A1   2/2012

OTHER PUBLICATIONS

Popescu et al. Synchronization of the time-domain wavelength interleaved networks. 2013 15th *International Conference on Transparent Optical Networks* (*ICTON*), IEEE, p. 1-4, Jun. 23, 2013.
(Continued)

*Primary Examiner* — Darren E Wolf
(74) *Attorney, Agent, or Firm* — Knobbe, Martens, Olson & Bear, LLP

(57) ABSTRACT

One embodiment relates to a method for transmitting data via an optical network comprising a plurality of optical nodes, in which at least one wavelength is dedicated to the transmission, in the network, of data bursts transmitted by at least one source node and wherein the data bursts are intended for an addressee node. The method may comprise transmitting a control message from the addressee node to the at least one source node wherein the control message is conveyed in an optical signal emitted according to the wavelength dedicated to the transmission, in the network, of data bursts intended for the addressee node.

17 Claims, 6 Drawing Sheets

(52) U.S. Cl.
CPC ...... *H04Q 11/0066* (2013.01); *H04J 14/0258* (2013.01); *H04Q 2011/0064* (2013.01); *H04Q 2011/0088* (2013.01)

(56) References Cited

OTHER PUBLICATIONS

Triki et al. Efficient control plane for passive optical burst switching network, 2013 *International Conference on Information Networking (ICOIN), IEEE*, pp. 535-540, Jan. 28, 2013.

Uščumlić et al. Scheduling aware dimensioning for time-domain wavelength interleaved network. 2014 *International Conference on Computing, Networking and Communications (ICNC), IEEE*, pp. 484-490. Feb. 3-6, 2014, Honolulu, HI.

French Search Report dated May 26, 2014 for French Application No. FR 1359449 filed Sep. 30, 2013, 9 pages.

International Search Report dated Dec. 9, 2014 for International Application No. PCT/FR2014/052337 filed Sep. 19, 2014, 7 pages.

C. M. Qiao and M. S. Yoo, "Optical burst switching (OBS)—a new paradigm for an Optical Internet," Journal of High Speed Networks., vol. 8, No. 1, pp. 69-84, 1999.

Widjaja et al., "Light core and intelligent edge for a flexible, thin-layered, and cost-effective optical transport network," IEEE Optical Communications, vol. 41, No. 5, pp. S30-S36, 2003.

\* cited by examiner

METHOD FOR TRANSMITTING DATA IN A TIME-DOMAIN WAVELENGTH-INTERLEAVED OPTICAL NETWORK

RELATED APPLICATIONS

This application is the U.S. National Phase of Application No. PCT/FR2014/052337 entitled "METHOD FOR TRANSMITTING DATA IN A TIME-DOMAIN WAVELENGTH-INTERLEAVED OPTICAL NETWORK" filed Sep. 19, 2014, which designated the United States, and which claims the benefit of French Application No. 1359449, filed Sep. 30, 2013.

GENERAL FIELD

The invention relates to the field of optical communication networks, and more particularly to the field of all optical networks with interleaved wavelengths in the time domain.

STATE OF THE ART

The data conveyed in the telecommunication networks are increasingly of the "packet" nature even if the optical transport networks operate in a circuit mode. The potential benefits of introducing packet switching in the optical domain, thus avoiding expensive and energy consuming optical-electrical-optical conversions, have been studied for years.

The concept of optical data burst switching (or "Optical Burst Switching", abbreviated as OBS) was introduced in 1999 by C. M. Qiao and J. S. Yoo for compensating the lack of flexibility of circuit switching optical networks and the immaturity of optical packet switching techniques (OPS). This solution was notably intensified by the increase in volumes of traffic and the generalization of the communications protocol IP, expressed by an increasingly sporadic traffic of the "packet" nature.

Unlike optical packet switching, OBS consists of grouping a certain number of packets intended for a same addressee node of an optical network in a same group, subsequently designated by data burst, and of transmitting this data burst to the addressee node.

This type of data transfer gives the possibility of releasing the technical constraints (processing speed) at the nodes, the burst being of a longer duration than the native IP packets. As the duration of the burst remains short (a few microseconds to a few milliseconds), the OBS technique allows significant statistical multiplexing which improves the filling of the channels. From this point of view, OBS is a good compromise between technical complexity and performance.

The transfer of data bursts in an optical network is ensured by reservation and configuration of intermediate nodes, step by step, in each node, by means of control packets or headers (or labels). In order to optimize the occupancy of the optical fibres and of the wavelengths, the OBS network is configured in order to avoid collisions in the intermediate nodes between bursts which would wish to access a same output port of this node at the same time. These solutions consist of using the time, spectral or spatial domains for solving contentions and thus avoiding collisions of bursts inside the node.

In addition to the capability of optical data bursts of improving the efficiency of the transport networks, a strong reduction in the electric consumption of these networks is expected with OBS techniques. This reduction is justified by the fact that ideally, the data bursts are transparently commuted in OBS networks, i.e. without any electronic processing, and that only the processing of control packets is optionally carried out thereon.

With the idea of ensuring passive commuting at the core nodes, studies have proposed a derivative of conventional OBS called "Time-domain Wavelength Interleaved Network", and commonly abbreviated as TWIN, which may be literally expressed by "network with interleaved wavelengths in the time domain".

In a TWIN network, each wavelength is dedicated for transporting data bursts to a single addressee node, which gives the possibility of ensuring routing in a passive wavelength and transparently at intermediate nodes and of simplifying the control plane of the network.

The TWIN approach gives the possibility of circumventing certain technological constraints of conventional OBS (e.g. constraints related to fast burst switching elements in the intermediate nodes) but does not omit the requirement of accurately controlling the transmission of data bursts between nodes and raises questions as to how to pass on information relating to such a control.

A control example is the ordering of the data emitted by different source nodes to a same addressee node. Indeed, if the ordering is not carried out properly, contentions are possible within a TWIN network on the wavelength assigned to an addressee node.

In this respect, inclusion in a TWIN network of a centralized control entity controlling the ordering of data bursts intended for a plurality of addressee nodes was contemplated. Such a control entity handles all the reservations by assigning to each source node resources to be used for transmitting data bursts to any destination.

This centralized approach however has multiple drawbacks. On the one hand, it imposes a strong constraint of a topological order (any source node of the network should actually be connected to the centralized control entity). It further requires the implementation of highly complex reservation algorithms in the centralized entity and induces many latencies (e.g. in terms of computing time, signalling time and message exchanges).

Moreover conveying control data in a TWIN network by means of an opaque network (i.e. where the intermediate nodes should proceed with optical-electrical-optical conversion in order to avoid contentions of control messages) which connects all the nodes and which uses a dedicated control wavelength (i.e. a wavelength which is not used by the addressee nodes), was contemplated.

This approach however has the drawback of requiring the dedication of a wavelength to this shared control channel, which involves a significant number of messages to be processed on a same wavelength.

Consequently, the resulting network is not an all-optical network, and therefore an energy consumer for messages of the control plane, which may lead to greater latency for the control plane and may pose possible scale-up problems.

PRESENTATION OF THE INVENTION

An object to be attained is therefore that of applying control operations relating to the transmission of data bursts in a TWIN network, and this in a purely optical way. Another object to be attained is that of applying transmission of such control information without requiring any additional wavelength.

In this respect, and according to a first aspect, a method for transmitting data through an optical network is proposed, comprising a plurality of optical nodes, in which at least one wavelength is dedicated to the transmission in the network of data bursts emitted by at least one of said nodes, said to be a source node, intended for one of said nodes, a so-called addressee node, the method being characterized in that it comprises the transmission of a control message from said addressee node to said at least one source node, the control message being conveyed in an emitted optical signal according to said wavelength dedicated to transmission in the network of data bursts intended for said addressee node.

Such a method gives the possibility of providing additional signalling capability in the control plane of a TWIN network without needing to resort to adding additional signalling wavelengths, or to reservation of a common opaque wavelength in the network, by reusing at the control plane, wavelengths already used in the transfer plane. On the other hand, it gives the possibility of using in a clever way the bandpass ordinarily not used in a standard TWIN network, in which only the leaf-towards-root direction is used for transmitting data according to the transfer wavelength.

The control message may be a message for allowing emission of a data burst, and the method according to the first aspect may further comprise the emission of said data burst, by said at least one source node intended for the addressee node, in an optical signal emitted according to said wavelength.

This authorization message allows remote handling of emission of bursts, controlled by the addressee node of these bursts, in an optimized control plane in terms of used optical resources.

The emission authorization message may contain at least one scheduling information determined by the addressee node, the data burst being emitted by the source node at an instant determined by the source node from the ordering information.

The ordering information allows accurate handling of the ordering of data bursts intended for an addressee node, in order to prevent collisions between these bursts in its transfer tree, optimally in terms of signalling capabilities. Moreover, the fact of entrusting in a distributed way the control of the ordering of the data bursts to the addressee nodes of these data bursts is much more simple to achieve than entrusting this control to a third party entity; each addressee node actually only has to generate a restricted number of control messages.

The transmission method according to the first aspect may also comprise a step for transmitting a request message from the source node to the addressee node, the message for allowing emission being emitted by the addressee node after receiving the request message by the addressee node.

The request message may further be conveyed in an optical signal emitted by the source node according to a dedicated wavelength for transmission of data bursts intended for the source node of the network, in order to handle the bidirectional signalling exchanges carried out during a process for transmitting data bursts, in an optimized control plane in terms of optical resources used.

The wavelength may moreover be dedicated to the transmission in the network of data bursts emitted by a plurality of source nodes, and in which the control message is a synchronization message comprising a time reference determined by the addressee node for synchronizing the transmissions of data bursts from said source nodes to the addressee node.

This gives the possibility of handling the synchronization between nodes in an optimized control plane in terms of optical resources used. As the intermediate nodes of the TWIN network do not need themselves to be synchronized, since they only participate in the forwarding of the synchronization information to the source nodes, and this in a passive and transparent way, such a solution limits the constraints related to the synchronization of the intermediate nodes.

The control message may further comprise a plurality of bits, the control message being emitted so that said bits are carriers of a reference rate intended to be used by said at least one source node. It is thus possible to distribute a reference clock to a set of nodes of the network, in an optimized control plane in terms of optical resources used.

According to a second aspect, an optical node, a so-called addressee node, is proposed for an optical network comprising a plurality of optical nodes, in which at least one wavelength is dedicated to the transmission in the network of data bursts emitted by at least one of said nodes, a so-called source node, intended for said addressee node, the addressee node comprising a module for receiving optical signals able to receive said data bursts, the addressee node being characterized in that it comprises a module for emitting optical signals, configured for emitting a control message to said at least one source node, the control message being transported in an optical signal emitted according to said dedicated wavelength for transmission in the network of data bursts intended for said addressee node.

According to a third aspect, an optical node is also proposed, a so-called source node, for an optical network comprising a plurality of optical nodes, in which at least one wavelength is dedicated to the transmission in the network of data bursts emitted by said source node intended for one of said nodes, a so-called addressee node, the source node comprising a module for emitting optical signals capable of emitting data bursts to said addressee node according to said wavelength, the source node being characterized in that it comprises a module for receiving optical signals capable of receiving a control message from said addressee node, the control message being conveyed in an optical signal emitted according to said wavelength dedicated to transmission in the network of data bursts intended for said addressee node.

The emission module of the source node may be further configured so as to emit towards the addressee node a request message arranged for triggering the emission of the control message by the addressee node.

According to a fourth aspect, an optical node is proposed, a so-called intermediate node, for an optical network comprising a plurality of optical nodes, in which at least one wavelength is dedicated to the transmission in the network of data bursts emitted by at least one of said nodes, a so-called source node, intended for one of said nodes, said addressee node, the intermediate node comprising optical routing means configured for forwarding towards the addressee node a data burst conveyed in an optical signal emitted by a source node according to said wavelength, the intermediate node being characterized in that it further comprises first means for optical broadcasting configured for forwarding toward said at least one source node a control message conveyed in an optical signal emitted by the addressee node according to said wavelength.

The intermediate node may further comprise second commuting means configured for forwarding toward the addressee node a request message conveyed in an optical signal emitted by a source node according to a wavelength dedicated to the transmission of data bursts intended for said source node in the network.

According to a fifth aspect, an optical communication network is proposed, comprising a plurality of optical nodes, in which at least one wavelength is dedicated to the transmission in the network of data bursts emitted by at least one of said nodes, a so-called source node, intended for one of said nodes, a said addressee node, the optical network comprising at least one transfer channel configured for forwarding said data bursts from said at least one source node to said addressee node, the optical network being characterized in that it further comprises at least one control channel configured for forwarding at least one control message from the addressee node to said at least one source node by means of an optical signal emitted according to a wavelength dedicated to the transmission of data bursts intended for the addressee node.

The optical network according to this fifth aspect may further comprise at least one intermediate node, belonging to the transfer channel and to the control channel and capable of receiving the optical signal conveying the control message from the addressee node and configured for forwarding said optical signal to said at least one source node.

DESCRIPTION OF THE FIGURES

Other features, objects and advantages of the invention will become apparent from the description which follows, which is purely illustrative and non-limiting, and which should be read with reference to the appended drawings wherein:

FIG. 1b illustrates the data path intended for an addressee node of the network illustrated in FIG. 1a;

FIG. 1c illustrates the data path intended for another addressee node of the network of FIG. 1a;

FIG. 2a illustrates an embodiment according to the present invention of a control plane for the TWIN network illustrated in FIG. 1a;

In the whole of the figures, similar elements bear identical references.

DETAILED DESCRIPTION OF THE INVENTION

An optical network with interleaved wavelengths in the time domain (TWIN) comprises at least one optical node emitting data bursts (called "source node") and at least one optical node receiving data bursts (called "addressee node"), a same node may simultaneously be a source and destination of data bursts. In the continuation of this application, the terms of "source" and "addressee" implicitly refer to the conveyance of data bursts in a so-called "transfer" plane.

In this TWIN network, two adjacent nodes may be directly connected to each other through an optical link comprising one or several optical fibers. The TWIN network may also comprise at least one intermediate node between a source node and an addressee node, each intermediate node being configured for applying the passive switching technique of data bursts described earlier.

Conventionally, a "channel" refers to a succession of optical links and/or of distinct intermediate nodes allowing forwarding of an optical signal with a constant wavelength in the TWIN network between two end nodes. Generally, a channel comprises two end nodes, N distinct intermediate nodes and N+1 distinct optical links, N being greater than or equal to zero (the case of N=0 corresponding to the case when both end nodes are adjacent).

Transfer Plane of a TWIN Network

The "transfer plane" of a TWIN network is defined as being the whole of the channels of this network dedicated to the conveyance of payload data bursts.

In this transfer plane, with each addressee node of the TWIN network, is associated a transfer tree defining data burst transfer channels connected to this addressee node in the TWIN network. The root of this transfer tree therefore represents an addressee node, and each leaf of the tree represents a source node capable of transmitting at a given instant, data bursts, towards this addressee node.

The data bursts are thus transmitted to the addressee node of the network along a "leaves-to-root" direction (i.e. from at least one source node to the addressee node) of the transfer tree associated with this addressee node. On the other hand, conventionally in this type of TWIN network, the opposite direction "root-to-leaves" of these transfer trees is not used in the transfer plane (i.e. for the conveyance of useful data).

A so-called "transfer" wavelength is assigned to each addressee node of the TWIN network (and therefore indirectly associated with the transfer tree associated with this addressee node) and used for transmitting optical signals conveying data bursts to this addressee node according to this transfer tree. A TWIN network by definition assumes that the transfer wavelengths are different for each addressee node. Thus, a same wavelength is not used for two different addressee nodes.

Figure 1A:
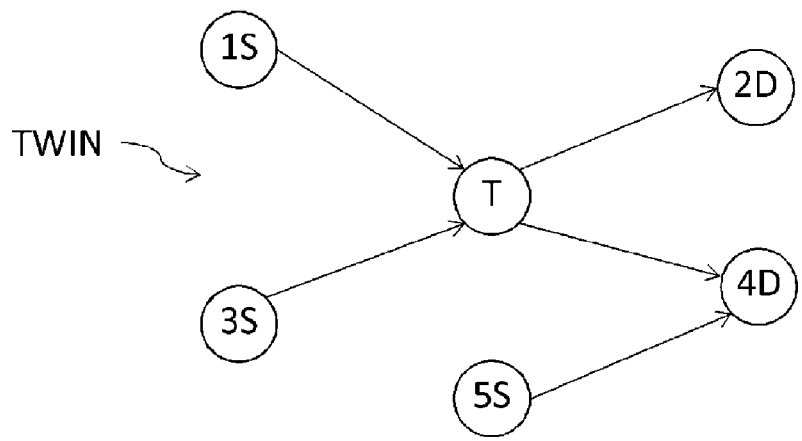
FIG. 1a illustrates the standard transfer plane of an optical network with interleaved wavelengths in the time domain (TWIN)

FIG. 1a illustrates the transfer plane of a conventional TWIN network. This network comprises:

two addressee nodes 2D, 4D (i.e. nodes which receive traffic from the source nodes) to which are respectively assigned distinct transfer wavelengths $\lambda 2$ and $\lambda 4$.

three source nodes 1S, 3S, 5S, i.e. nodes which send data bursts to the addressee nodes, by using the transfer wavelength associated with the addressee node for these data.

an all optical intermediate node T in the transfer plane, which only has the function of passively transferring received optical signals.

In order to transmit data to an addressee node, a source node should use the wavelength assigned to this addressee node.

Figure 1B:
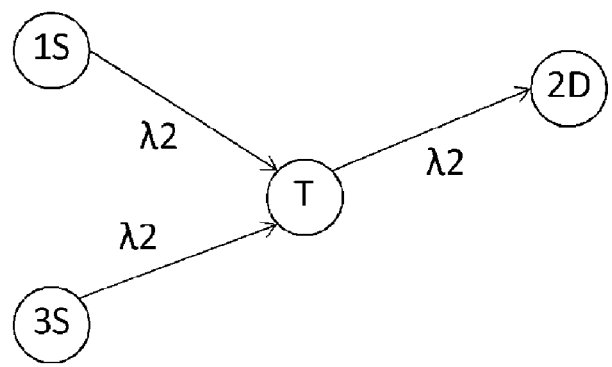

FIG. 1b thus illustrates the transfer tree associated with the addressee node 2D, wherein the nodes 1S and 3S transmit data bursts to the node 2D by means of optical signals of wavelength $\lambda 2$.

Figure 1C:
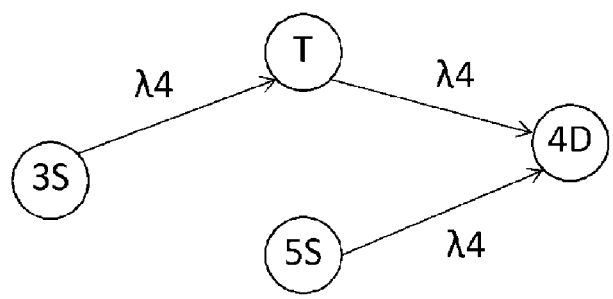

FIG. 1c illustrates the transfer tree associated with the other addressee node 4D, in which the nodes 3S and 5S transmit data bursts to the node 4D by means of optical signals of wavelength λ4.

It is recalled here that a node may in practice be both a source and a destination of data bursts, although this is not illustrated in FIGS. 1a to 1c, for more simplicity.

Embodiment of a Control Plane for a TWIN Network

As opposed to the transfer plane, dedicated to the conveyance of payload data bursts, a control plane (or command plane) of a TWIN network is defined as being the whole of the channels dedicated to the conveyance of control messages intended to organize the traffic of payload data bursts in the transfer plane.

This control plane may transport messages in the addressee node-to-source node direction, as well as optionally in the source node-to-addressee node direction. The control messages transmitted may for example be request messages or emission authorization messages ("grant") messages, used for allocating optical resources to the source nodes, as this will be seen later on.

Figure 2A:
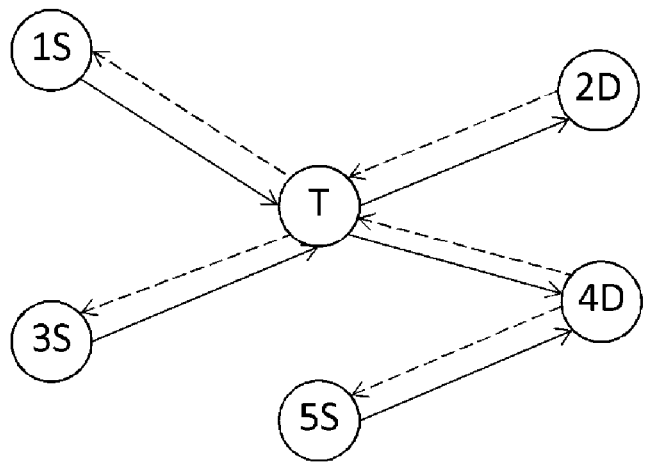

FIG. 2a illustrates an embodiment according to the present invention of such a control plane for the TWIN network of FIG. 1a, the conveyance of control messages in the channels of this control plane being illustrated by means of dashed lines in this figure and the following.

In order to set into place in an optimized way this control plane, in the present invention, the "root-to-leaves" direction is reused, not used by the transfer plane, in order to transmit control messages from an addressee node to its source nodes in its transfer tree.

In other words, the control messages emitted by an addressee node to a source node are transmitted in the control plane, by reusing the wavelength assigned to this addressee node in the transfer plane (i.e. the wavelength specifically used for sending data bursts to this addressee node), but in the direction opposite to the direction used by the transfer plane.

The control plane, as illustrated in FIG. 2a, then consists of control channels adapted for conveying control messages from each addressee node for a data burst to the corresponding source nodes, in a direction opposite to the direction of transmission of the data bursts from the transfer trees associated with each addressee node of the network.

The control plane may thus be represented as a set of control trees associated with each addressee node, in which each control tree "topologically" corresponds to the transfer tree associated with this addressee node in the transfer plane (i.e. it has the same "root" node and the same "leaves" nodes as this transfer tree), and wherein each transfer wavelength, initially assigned to a single addressee node in the transfer plane, may be designated as a "control" wavelength specifically assigned to this same addressee node for the transmission of control messages from this addressee node to the source nodes of this control tree.

In other words, to this addressee node is assigned a same wavelength for emitting control messages to its source nodes in the "root-to-leaves" direction of its control tree on the one hand and for receiving in the transfer plane, data bursts stemming from the source nodes, in the "leaves-to-root" direction of its transfer tree, both of these trees being topologically superposed. As this will be explained subsequently, the "root-to-leaves" direction may also be used for transferring control messages from this node to other addressee nodes when the relevant node plays the role of a source node.

Figure 2B:
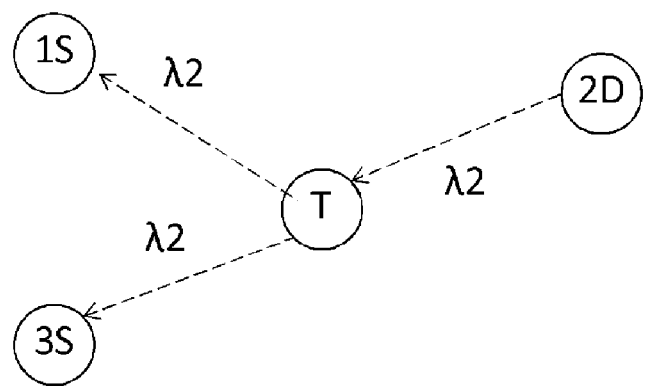
FIG. 2b illustrates the path of control messages emitted by the addressee node of FIG. 1b.

FIG. 2b thus illustrates, by referring to the single addressee node 2D of the network illustrated in FIG. 1a, the control tree associated with this node 2D.

In this control tree, topologically similar to the transfer tree illustrated in FIG. 1b, the control messages emitted by the addressee node 2D are conveyed by means of optical signals according to the wavelength λ2 to the whole of the source nodes of this tree, here the nodes 1S and 3S.

In this example, a control message emitted by an addressee node is transmitted to all the source nodes of its control tree. However, this control message may only be intended for a single one of these source nodes. In order to handle this aspect, the source nodes of the control tree advantageously have means for identifying control messages which concern them, for example capable of filtering these messages according to an identifier either designating or not the source node in the control message emitted by the addressee node.

The control message transmitted from an addressee node to a source node may notably be an authorization message for emitting a data burst, generated by the addressee node after receiving an emission request signalling to it that a data burst which is intended for it is ready to send at one of the source nodes.

In order to limit the risk of collisions of bursts at an intermediate node, or even at the addressee node, this emission authorization message may contain a scheduling information (typically designating an emission period interval allocated to the source node) controlling the emission by the source node of the data burst intended for this addressee node. The nature and how to generate this scheduling information are detailed later on.

As indicated earlier, any source node of the TWIN network may also be an addressee node, with a wavelength which is specifically associated with it, in the transfer plane for receiving data bursts and a transfer tree, in which this source node is the "root node", an addressee of the data bursts, and comprising a certain number of "leaf nodes".

It is then possible to reuse this wavelength, in the control plane for sending control messages from this source node to such addressee node(s), notably when these are the aforementioned emission request messages.

Thus, in an embodiment where there exists a first transfer tree, in which a first node is a source node and a second node is an addressee node, and a second transfer tree, in which the first node is an addressee node and the second node is a source node, not only the second node may use the wavelength which is allocated to it in the transfer plane for transmitting control messages to the first node, but the first node may also use the wavelength which is allocated to it in the transfer plane for transmitting control messages to the second node, which allows bidirectional signalling between these nodes reusing the transfer wavelengths, for emitting control messages in the direction where they are not used in the transfer plane.

Figure 2C:
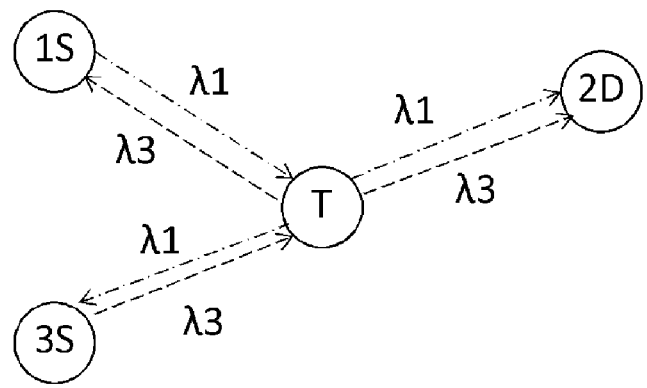
FIG. 2c illustrates the path of control messages intended for the addressee node of FIG. 1b.

FIG. 2c thus illustrates an embodiment for the portion of the control plane allowing the source nodes 1S and 3S to send control messages to the destination node 2D. In this embodiment, the control trees associated with the source nodes 1S and 3S respectively use the wavelengths λ1 and λ3 for the conveyance of control messages to the addressee nodes of these trees, these wavelengths λ1 and λ3 being the transfer wavelengths respectively associated with the nodes 1S and 3S for sending data bursts to these source nodes in the transfer plane.

Thus, the control messages emitted by the source node 1S are transmitted to the nodes 3S and 2D by using the wavelength λ1 and the control messages emitted by the source node 3S are transmitted to the nodes 1S and 2D by using the wavelength λ3. These wavelengths, initially assigned in the transfer plane, may thus be reused in the control plane, for transmitting control messages to the addressee node 2D.

Through the examples of FIGS. 2b and 2c, it is clearly seen that when the node 1S wishes to send a data burst to the node 2D, it may send an emission request message intended for this node 2D, by means of an optical signal using the wavelength λ1 assigned to the node 1S for receiving data bursts in the transfer plane, and the node 2D may answer it by returning to it an emission authorization message, by means of an optical signal using the wavelength λ2 assigned to the node 2D for receiving data bursts in the transfer plane. The thereby obtained control plane has a simple topology patterned on the transfer planes.

In this embodiment, when a node is both a source and destination of data bursts, time multiplexing of the control messages sent by this node on its control tree is advantageously applied, insofar that they use the same wavelength. Indeed, the control channel generated in the "root-to-leaves" direction of this control tree may simultaneously convey emission authorization messages, to certain nodes of this tree which may emit bursts to this node, and emission request messages to certain nodes of this tree to which this node wishes to transmit bursts. Thus, by again taking the example of FIG. 2b, the wavelength λ2 is used for conveying both emission authorization messages from the addressee node 2D to the source nodes 1S and 3S, but also emission request messages of the node 2D when the latter wishes to send data bursts to one of the nodes 1S and 3S.

In another embodiment, the request messages in the source node-to-addressee node direction, may be emitted in the transfer plane. In this case, the data bursts and the control messages pass through the same optical fibres, in the same transmission direction, for example by using a time multiplexing technique.

This particular topology of the control plane gives the possibility of covering the case when all the end nodes of the TWIN network are not necessarily both a source and destination of data bursts, while not requiring the use of any additional wavelength dedicated to the control plane in the source node-to-addressee node direction.

Embodiment of an End Node

Figure 3:
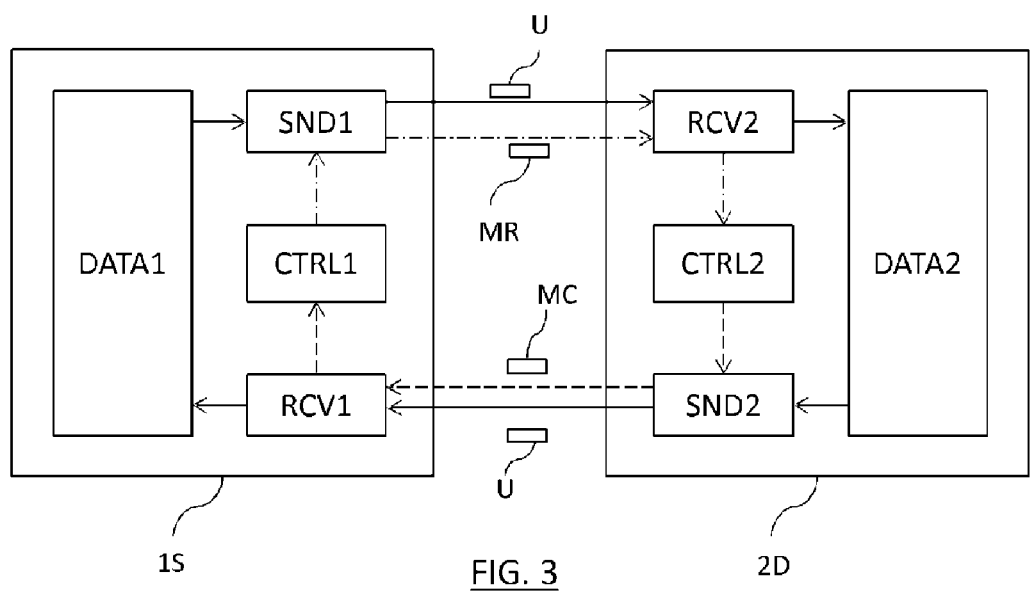
FIG. 3 schematically illustrates a source node and an addressee node of the network illustrated in the previous Figs., according to an embodiment.

FIG. 3 illustrates a source node and an addressee node according to an embodiment of the invention.

In this figure, the source nodes 1S and destination nodes 2D are taken as an example but their description may be generalized to the whole of the source and/or destination nodes of the TWIN network.

The source node 1S comprises a module for emitting optical signals SND1 and a module for receiving optical signals RCV1, as well as a data processing module DATA1 and a slave control module CTRL1 (typically implemented by a processor associated with a memory in which is stored a computer program comprising code instructions for the processing of data, when executed by this processor).

The emission module SND1 is configured for emitting optical signals over at least one optical link of the TWIN network and according to at least one wavelength, from data stemming from the data processing module DATA1 and/or from the slave control module CTRL1.

The emission module SND1 may comprise at least one optical source of a fixed and predetermined wavelength. Alternatively or additionally, this emission module may further comprise an optical source with a variable wavelength.

The emission module SND1 may also comprise an optical switcher ensuring the routing of each optical signal emitted towards an optical link to which the node is connected in the TWIN network, depending on the wavelength of the optical signal. Such a switcher may comprise an optical broadcaster, an optical splitter, an optical coupler or a combination of these devices.

The receiver module RCV1 is configured for receiving optical signals according to at least one wavelength from at least one optical link of the TWIN network, in order to extract data conveyed by these optical signals and for transmitting data extracted at the data processing module DATA1, or at the control module CTRL1.

The source node 1S moreover comprises a slave control module CTRL1 connected to the emission modules SND1 and receiver modules RCV1. The slave control module CTRL1 may comprise a plurality of slave control units, each slave control unit being dedicated to the control of the emission of data bursts intended for a respective addressee node. Each slave control unit may be coupled with a receiving unit configured with the control wavelength of a respective addressee node (for example node 2D) and with an emission unit configured with the transfer wavelength.

Moreover, the destination node 2D, emitting control messages intended for the source node, comprises a module for emitting optical signals SND2, a module for receiving optical signals RCV2, a data processing module DATA2, and a master control module CTRL2.

The emission module SND2 is configured for emitting optical signals over at least one optical link of the TWIN network and according to at least one wavelength, from data stemming from the master control module CTRL2.

The receiving module RCV2 is configured for receiving optical signals according to at least one wavelength, from at least one optical link of the TWIN network, extracting data conveyed by these optical signals and transmitting the extracted data to the data processing module DATA2, or to the control module CTRL2.

The addressee node 2D moreover comprises a master control module CTRL2 connected to the emission SND2 and reception RCV2 modules.

The receiving modules RCV1, RCV2 may comprise a plurality of detection units (e.g. photodetectors), each detection unit being adapted for capturing an optical signal with a set and predetermined wavelength. Alternatively or additionally, the receiving modules RCV1, RCV2 may comprise one or several detection units with a variable wavelength.

As already stated, an end node of the TWIN network may be both a source and a destination; such an end node then comprises a module for emitting optical signals, a module for receiving optical signals, a data processing module, a slave control module and a master control module according to the preceding description. The data processing module of such an end node receives and emits data, and the slave and master control modules are both connected to the reception and emission modules.

Embodiment of an Intermediate Note

Figure 4:
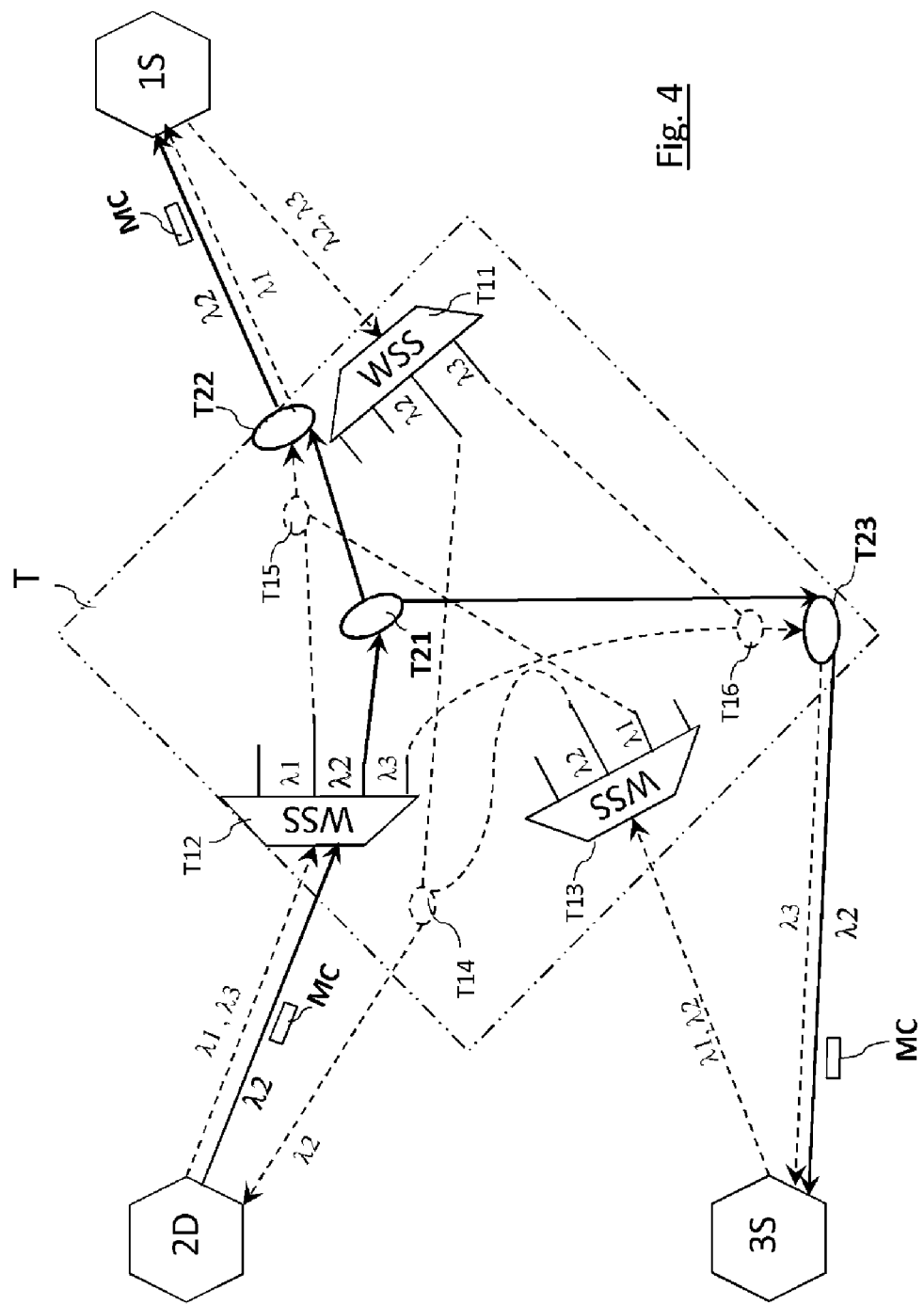
FIG. 4 schematically illustrates an embodiment of an intermediate node illustrated in FIGS. 1a to 2c.

Reference is now made to FIG. 4 which illustrates an intermediate node according to an embodiment of the invention.

FIG. 4 illustrates in dotted lines the transfer trees respectively associated with each node 1S,2D,3S, by indicating the wavelengths used for conveying data bursts on these transfer trees. It will be noted here that each intermediate node, adapted for implementing optical switching of data bursts, is connected to at least two optical links in the TWIN network. Thus, in the illustrated example, the node T is connected to two source nodes 1S and 3S as well as to an addressee node 2D. Further, the node T may be an end node integrating the functions of an intermediate node.

The intermediate node T comprises optical routing means T11 to T16 giving the possibility of forwarding towards the addressee node 2D, any data burst conveyed in an optical signal emitted by one of the source nodes 1S, 3S according to the wavelength $\lambda 2$.

These optical routing means may combine devices which are selective in wavelength, for example optical demultiplexers or switches which are selective in wavelength 1×N (called "Wavelength Selective Switch" and abbreviated as WSS), designated by T11 to T13, with optical couplers, designated by T14 to T16, typically in the form of a structure of the "select and combine" type (WSS combiner and then couplers). These optical routing means are thus used for implementing, in a conventional way, the transfer channel of the "leaves-to-root" direction of the transfer trees associated with the nodes 1S, 2D and 3S.

These optical routing means are however not adapted for applying the control channel in the "root-to-leaf" direction of the tree associated with the addressee node 2D, object of the invention, since wavelength selective switches WSS 1×N do not have the capability of broadcasting a wavelength of more than one output port (or even two ports for certain so-called "drop and continue" WSS elements). Consequently, the broadcasting of a control channel towards source nodes located in different directions from the node T cannot be achieved.

In order to apply the control channel in the "root-to-leaves" direction of the tree associated with the addressee node 2D, the intermediate node T comprises an additional broadcasting system (illustrated in solid lines in FIG. 4) assuming the form of optical broadcasting means configured for forwarding, to the source nodes 1S and 3S, the control message MC conveyed in an optical signal emitted by the addressee node 2D according to the wavelength $\lambda 2$.

These optical broadcasting means may notably consist in a set of couplers/optical splitters T21 to T23 allowing broadcasting of an optical signal emitted according to the wavelength $\lambda 2$, from the addressee node 2D to the source nodes 1S and 3S. In particular, this set of optical couplers/splitters T21 to T23 may be connected to a vacant output port of the WSS T12, the input port of which is connected to an optical link from the addressee node 2D, and to the output ports of the node T towards the source nodes 1S and 3S in order to allow the control channel to be broadcast. In the case when the WSS T12 does not have any vacant port, it is also possible to use an occupied port of this WSS T12 by combination with filtering (by means of a filter or a demultiplexer for example) in order to only selected the control channel.

Further, in order to allow transmission in the control plane by one of the source nodes, for example the node 1S, of a request message MR conveyed in an optical signal emitted according to wavelength $\lambda 1$ dedicated for receiving bursts by this node 1S, the intermediate node T may comprise another additional broadcasting system (not illustrated in FIG. 4) also assuming the form of optical broadcasting means, similar to the optical broadcasting means discussed previously (i.e. in the form of a set of optical couplers/splitters), and configured for forwarding, towards the source nodes 2D and 3S, any control message MR emitted by the node 1S on wavelength $\lambda 1$.

Transmission Method in the TWIN Network

Figure 5:
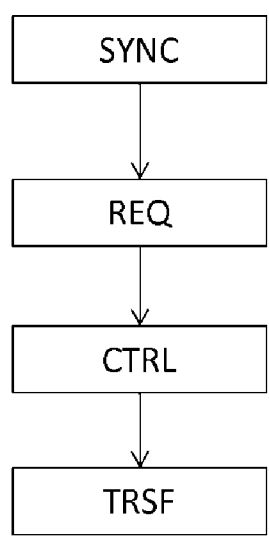
FIG. 5 shows the steps of a method for transmitting data, according to an embodiment.

FIG. 5 illustrates an embodiment of a method for transmitting a data burst U from the source node 1S to the addressee node 2D.

The nodes 1S and 2D are connected through a transfer channel comprising an optical link connecting the nodes 1S and T, the intermediate node T, and an optical link connecting the nodes T and 2D. The source 1S and destination 2D nodes are also connected through a control channel comprising an optical link connecting the nodes 1S and T, the intermediate node T, and an optical link connecting the nodes T and 2D.

In a sequence referenced as CTRL, the addressee node 2D transmits a control message MC to each of its source nodes 1S and 3S. Generally, the control message contains information contributing to the organization of the transmission of data bursts towards the addressee node 2D.

In a sequence referenced as TRSF, the source node 1S transmits the data burst U after receiving the control message MC by the source node 1S (of course, this sequence is also produced by the source node 3S via a transfer channel connecting the nodes 3S and 2D if this source node 3S has also a data burst to be transmitted to the addressee node 2D).

Figure 6:
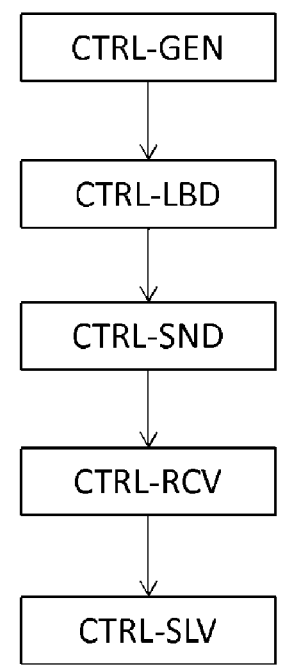
FIGS. 6 to 9 each show sub-steps of a respective step of the method illustrated in FIG. 5.

With reference to FIG. 6, the sequence CTRL may comprise the following steps:

In a step CTRL-GEN, the master control module CTRL2 generates a control message MC.

In a step CTRL-LBD, the emission module SND2 of the addressee node 2D determines the control wavelength $\lambda 2$ associated with the addressee node 2D in the transfer plane.

In a step CTRL-SND, the emission module SND2 of the addressee node 2D emits an optical signal according to the determined control wavelength $\lambda 2$ and transporting the generated control message MC.

The control message MC is then forwarded in the TWIN network by the control channel according to the control tree associated with the node 2D to the node 1S, via the node T, which splits the optical signal emitted by the addressee node 2D into two optical signals of same wavelength $\lambda 2$, one being routed towards the node 1S, the other one being routed towards the node 3S.

In a step CTRL-RCV, the receiving module RCV1 of the source node 1S detects the optical signal emitted by the node 2D, extracts the control message MC and transmits it to the slave control module CTRL1.

In a step CTRL-SRV, the slave control module CTRL1 processes the control message MC, and triggers the execution of the TRSF sequence depending on the contents of the control message MC.

Of course, the steps CTRL-RCV and CTRL-SRV are implemented in a similar way by the node 3S when this node 3S has a burst to be transmitted to the node 2D.

Figure 7:
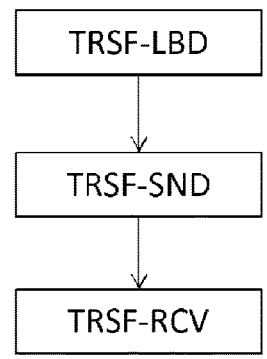

With reference to FIG. 7, the TRSF sequence typically comprises the following steps carried out for each of the source nodes capable of transmitting data bursts towards the addressee node 2D (node 1S will be taken here as an example).

In a preliminary step TRSF-LBD, the emission module SND1 of the source node 1S determines the transfer wavelength $\lambda 2$ assigned to the addressee node 2D of the burst U in the transfer plane.

In a step TRSF-SND, the emission module SND1 of the source node 1S generates an optical signal according to the determined transfer wavelength $\lambda 2$ and conveys the burst of data U intended for the addressee node 2D, according to the TWIN technique.

This optical signal is then forwarded in the TWIN network through the transfer channel connecting the source node 1S and the addressee node 2D, conventionally.

In a step TRSF-RCV, the receiving module RCV2 of the addressee node 2D detects the optical signal emitted by the node 1S, extracts the data burst U which it conveys and transmits to the data processing module DATA2.

With such a method, no third party control entity is required, and no additional piece of equipment involving the application of an optical-electrical-optical conversion is required. The described method may be applied for any data burst to be transmitted from any source node to any addressee node of the TWIN network.

Embodiments for Triggering the Transmission of a Control Message

In an embodiment, the control message MC is issued by the addressee node 2D following the reception of a request stemming from one or several arbitrary source nodes having a data burst intended for this node 2D, for example node 1S, in order to optimize the allocation of the optical resources to the different source nodes.

In this embodiment, the slave control module CTRL1 then comprises a storage unit, for example one or several flash memory(ies) or EEPROMs, a clock and a time counter. A sequence referenced as REQ is then produced before the sequence CTRL for transmitting the control message MC.

Figure 8:
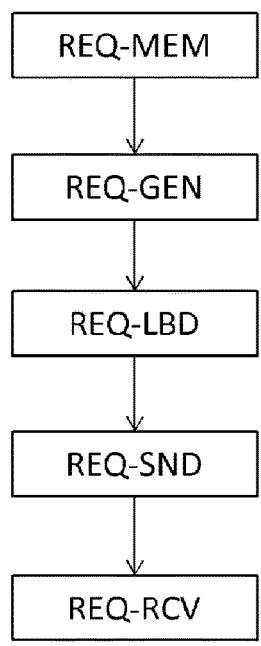

FIG. 8 illustrates this REQ sequence, which may comprise the following steps:

In a step REQ-MEM, the slave control module CTRL1 of the source node 1S receives from the data processing module DATA1 the burst U to be transmitted and stores it in memory in its storage unit.

In a step REQ-GEN, the slave control module CTRL1 of the source node 1S generates a request message MR intended for the addressee node 2D.

This request message MR notably contains an indication that a data burst U is ready to be transmitted to the node 2D, as well as optional other pieces of information such as QoS elements on the data awaiting transmission, information on the desired resources, etc.

In a step REQ-LBD, the emission module SND1 of the source node 1S determines a request wavelength to be used. As this was seen earlier, this request wavelength is advantageously the transfer wavelength $\lambda 1$ specifically associated with the source node 1S in the transfer plane.

In a step REQ-SND, the emission module of the source node 1S emits an optical signal according to the determined request wavelength $\lambda 1$ and conveying the request message MR.

The optical signal transporting the request message MR is then forwarded in the TWIN network by the control channel connecting the node 1S and the node 2D, according to the control tree associated with the node 1S.

In a step REQ-RCV, the receiving module of the addressee node 2D detects this optical signal, extracts the request message MR which it contains and transmits it to the master control module CTRL2 of the addressee node 2D.

The control message MC is then generated during the step CTRL-GEN, depending on the different request messages MR received by the addressee node 2D.

Insofar that this control message MC is an emission authorization message, it comprises a scheduling information determined by the addressee node 2D so as to avoid collisions of bursts on a same wavelength, when there are several data bursts transmitted by several source nodes. This scheduling information may be determined depending on the emission requests MR received from different source nodes, as well as on the estimated propagation time between the source nodes having emitted these requests and the addressee node 2D.

In an alternative of this embodiment, during the step REQ-LBD, the emission module SND1 of the source node 1S determines that the request wavelength to be used is the wavelength $\lambda 2$ associated with a node 2D, and the request message MR is then conveyed in step REQ-SND over this determined wavelength $\lambda 2$, via time multiplexing with the transfer plane conveying the U data.

In another embodiment, the control message is delivered by the addressee node spontaneously (for example periodically) to each of its source nodes in the TWIN network.

If the emission module of the addressee node 2D has as many emission units as there are source nodes in the network able to transmit data bursts to this addressee node 2D, the sequence CTRL for transmitting the control message may then be produced in parallel, for each of these source nodes via respective emission units.

Scheduling of Data Bursts to a Same Addressee Node

In an embodiment, the control message MC comprises at least one scheduling information, each scheduling information being intended for a source node able to transmit data bursts to the addressee node.

This ordering information may notably consist in a time interval (directly designated from among a set of predefined time intervals or by indicating the instants of the beginning and of the end of this time interval) during which the source node is allowed to emit this data burst to the addressee node.

Each scheduling information may also comprise an identifier of a source node unique in the network. For example, the node 2D being the addressee of the source nodes 1S, 3S, the message MC then comprises a first scheduling information intended for the node 1S, in which is inserted an identifier of this node 1S, and a second scheduling information intended for the node 3S, into which is inserted an identifier of this node 3S.

Thus, during the step CTRL-SRV carried out by the node 1S, the slave control module CTRL1 may then apply filtering to the contents of the extracted control message MC, on the basis of the detection of this identifier of this source node, and selectively process the scheduling information comprising the single identifier associated with the node 1S, and only the latter, by ignoring the other pieces of ordering information relating to other source nodes.

During step CTRL-SRV then carried out by the node 1S, the slave control module CTRL1 determines the instant when a data burst is to be emitted towards the node 2D, from the scheduling information received from this node 2D.

To do this, the slave control module of the node 1S may comprise a time counter, in which case this time counter is started for a certain period depending on the received scheduling information, so as to observe the emission time interval indicated by the node 2D. The slave control module CTRL1 then triggers the emission of the burst U after expiry of the time counter.

In an alternative embodiment, the scheduling information may comprise an interval of dates, and the expected waiting time may be determined by the control module CTRL1 of the source node 1S, so that the instant of emission of the data burst U is comprised in this interval of dates.

In another alternative embodiment where the source nodes communicate with the addressee nodes by communication cycles consisting of time slots, the scheduling information may comprise at least one time slot reference, designating the time slot to be used for emitting the data burst U. In this case, the node 1S carries out the emission of this burst U during a next cycle, in the time slot(s) which have been assigned to it by the node 2D.

For example, let us assume that the communication cycle between the source nodes 1S, 3S and the addressee node 2D consist of four time slots numbered as 1 to 4. The first scheduling information intended for the node 1S may comprise the references 1 and 2, and the second scheduling information intended for the node 3S comprises the references 3 and 4. During a subsequent communication cycle, the node 1S may then transmit data bursts to the node 2D during the time slots 1 and 2, while the node 3S may transmit data bursts to the node 2D during the time slots 3 and 4.

This alternative gives the possibility of allocating to each source node time resources in advance for more than one data burst to be transmitted, and of reducing the number of transmitted request messages, which gives the possibility of obtaining savings which gives the possibility of making savings on the band pass in the control plane.

Regardless of the type of selected scheduling information, it is advantageous that the instants for emitting bursts at different source nodes intended for a same addressee node take into account distances between the source nodes and the addressee node, which may different. Consequently, it is possible that bursts may be emitted at the same time by different source nodes, but because of different travel times, these bursts are conveyed on the transfer tree without any overlapping.

In particular, the instant for emitting a data burst may be determined by the addressee node from a propagation time in the corresponding transfer channel connecting this addressee node to the source node emitting this burst.

Synchronization Between End Nodes

In certain configurations, it may prove to be necessary to synchronize together the source nodes emitting data bursts to a same addressee node, in order to apply very accurately the described ordering, or even the frequency clocks of the different addressee nodes.

This coordination involves several aspects:
compensation for the propagation times, in order to avoid contentions during the emission of a data burst, because the distances between an addressee node and each of its source nodes are different.
synchronization between the source nodes emitting towards a same addressee node in order to share a common time reference, required for the ordering operations.

The compensation of the propagation times may be achieved by means of known methods, for example by applying a method for calculating the roundtrip time optionally accompanied by preliminary calibration, or further by using GPS receivers at the end nodes.

In an embodiment, a synchronization of the end nodes of the network is applied by means of the control channels described earlier, and of at least one addressee node described as a "master" node.

The control module of this master addressee node then comprises a synchronization unit, which for example be an internal clock with a predetermined frequency and generating a time scale, or else a communications interface receiving synchronization information issued by an external entity (not shown). Moreover, the control module of each source node comprises at least one servo control unit.

The method then comprises an additional sequence SYNC for transmitting a synchronization message, from the addressee node to each source node according to the (control) wavelength assigned to the addressee node in the transfer plane. This sequence SYNC may advantageously be carried out before the sequences REQ, CTRL and TRSF, after these sequences, or else in parallel.

Figure 9:
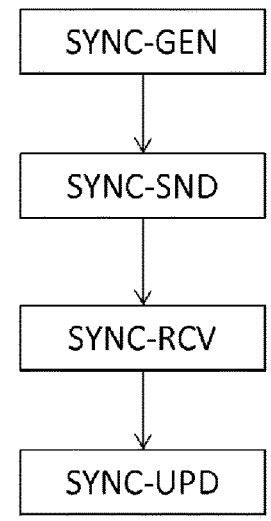

FIG. 9 illustrates such a sequence SYNC.

This sequence SYNC typically comprises the following steps.

At an addressee node:
generating (step SYNC-GEN) by the synchronization unit a time reference, for example the beginning of an ordering cycle established by the addressee node,
emitting (step SYNC-SND) by the emission module of the addressee node a synchronization message containing this time reference, in an optical signal using the wavelength assigned to this addressee node in the transfer plane, At each source node:
receiving the synchronization message, extracting the time reference and transmitting the time reference to the servo control unit of the source node (step SYNC-RCV),
updating (step SYNC-UPD) a communication cycle, by the servo control module of this source node, from the received time reference, in order to govern the subsequent emissions of data burst, from this source node to the addressee node, depending on this updated communication cycle.

The thereby updated communication cycle is used for ordering data bursts intended for the master node. This synchronization sequence corresponds to the establishment of a time clock associated with the addressee node and distributed by the latter to the source nodes, each clock being potentially totally independent, i.e. the beginnings of cycles of different addressee nodes are not necessarily aligned. This therefore amounts to achieving a phase alignment of the source nodes relatively to their master addressee node, by taking into account propagation times. In this embodiment, a source node is not absolutely synchronized but relatively to the addressee node having provided it with a synchronization message.

In a particular embodiment, a source node is able to receive synchronization messages stemming from several master addressee nodes (and therefore transmitted according to several different control wavelengths) and may then comprise several servo control units, each servo control unit maintaining an independent communication cycle associated with a respective master addressee node. In this embodiment, each servo control unit may be connected to a respective detected unit, configured for receiving optical signals emitted on a control wavelength associated with a respective master addressee node.

Alternatively, the servo control units may be connected to an optical receiver with a variable wavelength, configured for successively receiving optical signals emitted on different control wavelengths of the destination modules. In this alternative, the sending frequency by the addressee nodes of synchronization messages may be limited. Between each update, in the case of a distribution of a common frequency synchronization to all the end nodes, the cycles progress at the rate of the common frequency distributed by the network, to which all the end nodes have access.

The switching from one addressee node to the other is simplified at a source node, because of the common frequency synchronization, which easily gives the possibility of maintaining the condition of each cycle of the addressee nodes.

In these different embodiments, independently of the relative time synchronization mentioned earlier, the control messages may be emitted so that their bits are transmitted according to a reference rate, this reference rate being intended to be used by the end nodes for frequency synchronizing these end nodes, as explained earlier. The control channel, object of the present invention, may then be used for conveying this frequency synchronization reference.

In an embodiment of a TWIN network, each end node is both a source, destination and master node. Each end node is then able to receive a frequency synchronization reference stemming from any other end node of the network, and comprises a synchronization unit and at least one servo control unit. In another embodiment of a network, each end node is both a source and destination node, a single end node is a master node, and each non-master end node is configured for rebroadcasting the frequency synchronization reference received at its source nodes, according to the corresponding control wavelength.

The distribution of the synchronization messages may be ensured by the network (therefore by the intermediate nodes) for example by using a physical layer protocol such as the "Synchronous Ethernet" mechanism on the control channel object of the invention.

Of course, the invention is not limited to the exemplary embodiments described above and illustrated, from which it is possible to provide other modes and embodiments, without however departing from the scope of the invention.

In particular, an embodiment has been described in which an addressee node sends to the whole of the source nodes which are associated with it, in its transfer tree, a control message intended for one of its source nodes in particular, the source nodes then comprising identification means so as to be able to filter the messages which concern them. However it may be conceivable of only transmitting this control message to a restricted number of these source nodes, or even to the single relevant node, in return for the addition of additional routing functions in the optical network, for example at the intermediate node.

Moreover, the control channel according to the invention has been described as being used for the transmission between nodes of pieces of information relating to the transmission of data bursts, whether this is for synchronizing the nodes, handling the ordering of their emission or requesting a consent as to this emission. However it is also conceivable to use the principle of the present invention for transmitting between source and destination nodes network bursts, control messages containing information not necessarily being related to the emission strictly speaking of the bursts, such as for example messages containing management information of the network, messages containing QoS information or messages containing statistical information relating to the nodes of the network.

Further, an addressee node for a first given transfer tree may quite be a source node in a second transfer tree associated with one of the source nodes of the first transfer tree. In this case, it is conceivable to use the direction "root to leaf" of this second transfer tree for producing a control channel from the source node to the addressee node, which gives the possibility of having a bidirectional control channel between both of these nodes, in return for the coordination of the emission of the control messages in the direction in order to avoid collisions. The architecture of the nodes may then be symmetrical with the architecture in the direction "leaf to root", the transmission of the control messages as far as the source node may advantageously apply an additional mechanism for guaranteeing their integrity, such as for example a mechanism for retransmission or coordination by the source nodes.

In particular, in the case of a transfer tree where the source nodes of the transfer plane emits at a set wavelength, the transfer and control planes being inverted, it is advantageous to apply a management of the control messages identical with the one applied in the transfer plane for a normal configuration where the source nodes emit at tuneable wavelengths.

The invention claimed is:

1. A method for transmitting data carried out by an addressee node of an optical network comprising a plurality of optical nodes, the addressee node comprising an optical receiver for receiving an optical data signal carrying data bursts in at least one transfer wavelength specifically assigned to the addressee node for a transmission of data bursts to the addressee node, the method comprising:
generating, by a processor of the addressee node, a control message intended for at least one source node of the optical network;
emitting, by an optical source of the addressee node, an optical control signal in said at least one transfer wavelength, wherein the optical control signal carries the generated control message; and
receiving, by the optical receiver of the addressee node, an optical request signal emitted by a source node and carrying a request message, wherein the request message is conveyed in an optical signal emitted by the source node according to a transfer wavelength dedicated to the transmission of data bursts intended for the source node in the network.

2. The transmission method according to claim 1, wherein the control message causes the source node to emit an optical data signal.

3. The transmission method according to claim 2, wherein the control message contains at least one scheduling information, determined by the addressee node, causing the source node to emit the optical data signal at an instant determined by the source node from the scheduling information.

4. The transmission method according to claim 2, further comprising receiving, by an optical receiver of the addressee node, an optical request signal emitted by a source node and carrying a request message, wherein the optical control signal is emitted by the addressee node after receipt of the request message by the addressee node.

5. The transmission method according to claim 1, wherein a transfer wavelength is used for transmitting data bursts, emitted by a plurality of source nodes, intended for the addressee node, and wherein the control message is a synchronization message comprising a time reference determined by the addressee node for synchronizing the transmissions of data bursts from a plurality of source nodes to the addressee node.

6. The transmission method according to claim 1, wherein the control message comprises a plurality of bits, and wherein the control message is emitted so that said bits are carriers of a reference rate intended to be used by said at least one source node.

7. An addressee optical node for an optical network comprising a plurality of optical nodes, wherein the addressee node comprises:
an optical receiver for:
receiving an optical data signal in at least one transfer wavelength specifically assigned to the addressee node for a transmission of data bursts to the addressee node in the network, wherein the optical data signal carries data bursts; and receiving an optical request signal emitted by a source node and carrying a request message, wherein the request message is conveyed in an optical signal emitted by the source node according to a transfer wavelength dedicated to the transmission of data bursts intended for the source node in the network;

a processor configured to process the data bursts and generate a control message intended for at least one source node of the optical network; and an optical source for emitting an optical control signal in said at least one transfer wavelength, wherein the optical control signal carries the generated control message.

8. A source optical node for an optical network comprising a plurality of optical nodes, the source node comprising:
an optical receiver for:
receiving an optical control signal in at least one transfer wavelength specifically assigned to an addressee node for a transmission of data bursts to the addressee in the network, wherein the optical control signal carries a control message; and
receiving an optical request signal emitted by a source node and carrying a request message, wherein the request message is conveyed in an optical signal emitted by the source node according to a transfer wavelength dedicated to the transmission of data bursts intended for the source node in the network;
a processor configured to process the control message and generate data bursts intended for the addressee node; and
an optical source for emitting an optical data signal in the at least one transfer wavelength, wherein the optical data signal carries said data bursts.

9. The source optical node according to claim 8, wherein the processor generates a request message intended for the addressee node, wherein the request message causes the addressee node to emit the optical control signal carrying the control message.

10. An intermediate optical node for an optical network comprising a plurality of optical nodes, the intermediate node comprising:
an optical router comprising a wavelength-selective device, the optical router in optical communication with a source node to receive a data burst conveyed in an optical data signal, and in optical communication with an addressee node to forward the data burst toward the address node in at least one transfer wavelength specific to the addressee node, the wavelength-selective device comprising optical demultiplexers or switches; and
an optical broadcaster in optical communication with the addressee node to:
receive a control message conveyed in an optical control signal emitted by the addressee node in the at least one transfer wavelength; and
receive an optical request signal emitted by the source node and carrying a request message, wherein the request message is conveyed in an optical signal emitted by the source node according to a transfer wavelength dedicated to the transmission of data bursts intended for the source node in the network; and in optical communication with at least one source node of the optical network to forward the control message and the request message to the at least one source node, wherein the optical broadcaster comprises optical couplers or splitters.

11. The intermediate optical node according to claim 10, further comprising second switching components configured to forward towards the addressee node a request message conveyed in an optical signal emitted by a source node according to a transfer wavelength dedicated to a transmission of data bursts intended for said source node in the network.

12. An optical communications network comprising:
an addressee optical node as claimed in claim 7; and
a source optical node as claimed in claim 8, wherein the optical data signal is emitted by the source optical node and wherein the optical control signal is emitted by the addresses optical node.

13. The optical network according to claim 12, wherein the source optical node transmits a request message intended to the addressee node, and wherein the request message causes the addressee optical node to emit the control message.

14. The optical network according to claim 12, further comprising at least one intermediate node, as claimed in claim 10 to forward the data bursts from the source optical node to the addressee optical node and to forward the control message from the addressee optical node to the source optical node.

15. The transmission method according to claim 3, further comprising transmitting a request message from the source node to the addressee node wherein the control message is emitted by the addressee node after receipt of the request message by the addressee node.

16. The optical network according to claim 13, further comprising at least one intermediate node configured to receive the optical signal conveying the control message from the addressee optical node and configured to forward said optical signal to said at least one source optical node.

17. A method for transmitting data carried out by a source node of an optical network comprising a plurality of optical nodes, the method comprising:
receiving, by an optical receiver of the source node, an optical control signal in at least one transfer wavelength specifically assigned for a transmission of data bursts to an addressee node in the network, wherein the optical control signal carries a control message,
processing, by a processor of the source node, the control message,
generating, by the processor of the source node, data bursts intended for the addressee node,
emitting, by an optical source of the source node, an optical data signal in at least one transfer wavelength specifically assigned for the transmission of data bursts to the addressee node in the network, wherein the optical data signal carries said data bursts, and
receiving an optical request signal emitted by the source node and carrying a request message, wherein the request message is conveyed in an optical signal emitted by the source node according to a transfer wavelength dedicated to the transmission of data bursts intended for the source node in the network.

* * * * *